United States Patent

Omori et al.

Patent Number: 5,854,313
Date of Patent: Dec. 29, 1998

[54] FINE PARTICLES OF HIGH HEAT RESISTANT POLYMER AND EPOXY ESTERS

[75] Inventors: Yoshimasa Omori; Hiroya Okumura, both of Fujisawa; Takashi Shibata, Kamakura, all of Japan

[73] Assignee: Takeda Chemical Industries, Ltd., Osaka, Japan

[21] Appl. No.: 845,206

[22] Filed: Apr. 21, 1997

Related U.S. Application Data

[63] Continuation-in-part of Ser. No. 535,473, Sep. 27, 1995, abandoned.

[30] Foreign Application Priority Data

| Sep. 28, 1994 | [JP] | Japan | 6-233375 |
| Feb. 3, 1995 | [JP] | Japan | 7-017163 |
| Aug. 4, 1995 | [JP] | Japan | 7-199955 |

[51] Int. Cl.⁶ ............................................. C08K 3/20
[52] U.S. Cl. ..................... 523/406; 523/410; 525/529; 525/530; 525/531; 525/922; 430/280; 430/281; 430/288; 522/100
[58] Field of Search ........................... 523/406, 410; 525/529, 530, 531, 922; 430/280, 281, 288; 522/100

[56] References Cited

U.S. PATENT DOCUMENTS

| 3,651,649 | 3/1972 | Najvar et al. | 525/922 |
| 3,669,911 | 6/1972 | Najvar | 525/922 |
| 3,799,903 | 3/1974 | Najvar et al. | 525/922 |
| 3,912,670 | 10/1975 | Huemmer et al. | 525/922 |
| 3,933,935 | 1/1976 | Zachariades et al. | 260/836 |
| 4,097,994 | 7/1978 | Reaville et al. | 525/530 |
| 4,414,367 | 11/1983 | Gardner | 525/531 |
| 4,540,752 | 9/1985 | McFadden | 525/531 |
| 4,789,620 | 12/1988 | Sasaki et al. | 430/280 |
| 4,888,269 | 12/1989 | Sato et al. | 430/280 |
| 5,084,353 | 1/1992 | Cobbledick et al. | 428/413 |
| 5,102,702 | 4/1992 | Grundke et al. | 427/444 |
| 5,223,558 | 6/1993 | Ohba | 523/456 |

FOREIGN PATENT DOCUMENTS

| 0 065 020 | 11/1982 | European Pat. Off. . |
| 0 220 637 | 5/1987 | European Pat. Off. . |
| 0 240 984 | 10/1987 | European Pat. Off. . |
| 0 346 486 | 12/1989 | European Pat. Off. . |
| 0 406 453 | 1/1991 | European Pat. Off. . |
| 0 421 086 | 4/1991 | European Pat. Off. . |
| 0 554 215 | 8/1993 | European Pat. Off. . |
| 7-258 359 | 3/1994 | Japan . |
| 7-133328 | 5/1995 | Japan . |
| WO94/04583 | 3/1994 | WIPO . |

*Primary Examiner*—Randy Gulakowski
*Attorney, Agent, or Firm*—Wenderoth, Lind & Ponack, L.L.P.

[57] ABSTRACT

Fine particles of high heat resistant polymer obtained by emulsion polymerization or seeded polymerization of at least one epoxy ester (C) having two or more unsaturated bonds in one molecule and at least one reactive monomer (D) having at least one unsaturated double bond in one molecule, in the absence of a water-insoluble inorganic material as a dispersion stabilizer, the epoxy ester (C) being obtained by adding at least one unsaturated monobasic acid (B) to at least one epoxide (A-1) having at least one glycidyl group and one monocyclic hydrocarbon group in one molecule, and/or at least one epoxide (A-2) having at least one cycloaliphatic epoxy group in one molecule. The fine polymer particles have excellent heat resistance and solvent resistance, and an aqueous or alcoholic dispersion of such fine polymer particles is produced therefrom.

12 Claims, 6 Drawing Sheets

FINE PARTICLES OF HIGH HEAT RESISTANT POLYMER AND EPOXY ESTERS

This application is a Continuation-in-Part of now abandoned application Ser. No. 08/535,473, filed Sep. 27, 1995.

BACKGROUND OF THE INVENTION

1. Field of the Invention

The present invention relates to fine particles of epoxy ester polymer being prepared from a selected epoxy ester and having a high degree of crosslinking, excellent heat resistance and solvent resistance, and a narrow particle size distribution.

2. Description of the Prior Art

Fine polymer particles having a high degree of crosslinking, excellent heat resistance and solvent resistance, and a narrow particle size distribution are useful as fillers for resins, carriers for chromatography, spacers of liquid crystal display panels, standard samples for microscope observation, and reagents of clinical laboratory tests.

Conventionally, inorganic fillers, such as calcium carbonate, silica, talc, or clay, have been extensively used as fillers for resins for the purpose of improving the physical properties of the resultant resin articles. These inorganic fillers are advantageous in that they exhibit very useful properties inherent to inorganic materials, i.e., very high heat resistance and solvent resistance, and, thus, for example, they can be added in the process of synthesizing or molding resins even a high temperature of 250° C. or higher. However, in some resin articles, the fillers are required to have a uniform particle size and for this requirement, classification should be repeatedly conducted on the fillers for the desired uniformity in particle size. Such repeated classification is a very time- and cost-consuming operation. Further, in some cases, inclusion of undesirable coarse particles is unavoidable in this operation, thereby making it impossible to achieve the desired physical properties. Even if inorganic fillers having a uniform particle size, such as spherical silica particles, can be obtained, they have some significant disadvantages inherent to inorganic fillers, i.e., poor affinity for resins and large difference in specific gravity between the fillers and resins. The inorganic fillers accordingly do not exert the required physical properties in molding or in use of molded articles.

Under such circumstances, a possible alternative is to use organic fillers having a good affinity for plastics and specific gravities comparable to those of plastics. The organic fillers are also required to have excellent solvent resistance, uniformity in particle size, good affinity for plastics and toughness as well as heat resistance at a high temperature as described previously.

Fine polymer particles are generally prepared by grinding polymers or through emulsion polymerization or suspension polymerization.

Generally, emulsion polymerization, especially seeded polymerization, is well suited for manufacturing fine polymer particles of substantially uniform particle size. Particles obtained by emulsion polymerization or other methods, such as dispersion polymerization, are used as seeds, which are swollen with a solvent and a polymerizable monomer and grown through polymerization in the swollen seeds. This method with appropriately selected seeds gives particles having a sharp particle size distribution. The particle size can be controlled by the swelling rate of the seeds with respect to the polymerizable monomer.

This method of polymerization, however, restricts the molecular weight and content of applicable monomers or crosslinking oligomers used therein, and thus fails to give fine polymer particles which simultaneously satisfy all the requirements for heat resistance, solvent resistance, good affinity for resins, toughness, etc. For example, heat resistance and solvent resistance can be achieved to a certain extent by using crosslinked poly-styrenes such as divinylbenzene-styrene, but in this case the content of divinylbenze should be limited to such a level that emulsion polymerization may proceed smoothly without any problem caused due to the introduction of divinylbenze. Therefore, sufficient heat resistance and solvent resistance cannot be achieved by the foregoing crosslinked poly-styrenes. As a further disadvantage, the crosslinked polystyrenes are poor in toughness because of the absence of flexible part and poor in affinity for resins because of the absence of ester group, hydroxyl group, or the like. In case where aliphatic (meth) acrylate or aliphatic epoxy ester is used as a crosslinking agent, emulsion polymerization cannot proceed smoothly when the crosslinking agent is used in an amount sufficient to obtain high heat resistance. On the other hand, when the amount is suppressed to successfully proceed with emulsion polymerization, satisfactory hardness at a high temperature cannot be obtained because of such a suppressed use of crosslinking agents. Further, when emulsion polymerization is carried out employing generally used epoxy esters, such as bisphenol-type epoxy esters, phenol novolac-type epoxy esters, cresol, novolac-type epoxy esters or the like they are not smoothly transferred into micells thereof in emulsion polymerization. This causes separation of an oil phase from a water phase or generates a large quantity of aggregates, thereby not giving a stable emulsion. Even in an emulsion-polymerizable system, the epoxy ester content should be suppressed below 20% by weight and therefore, a practical heat resistance cannot be obtained.

Suspension polymerization is technically not suited for preparing fine polymer particles of substantially uniform particle size. This is partly ascribed to coalescence of particles in the suspension polymerization. Dispersion stabilizers are generally used to prevent coalescence of particles and stabilize the polymerization process. Typical examples of dispersion stabilizer include inorganic salts, such as calcium carbonate or calcium phosphate, and water-soluble polymers, such as polyvinyl alcohol or gelatin. Even addition of such a dispersion stabilizer, however, can not make stirring-based shearing forces, which affect the particle size of growing particles, uniform at every point in the system.

Actually, although addition of a dispersion stabilizer can make polymer particles of relatively large size as 1 through 100 $\mu$m, the particles thus obtained have an undesirably wide particle size distribution and it is very difficult to produce monodispersed particles.

As alternative approaches, attempts have been made to implement polymerization after preparation of an emulsion having a very sharp particle size distribution by emulsification with various kinds of emulsifiers having a greater shearing force.

As an example of such attempts, there is mentioned an emulsification using T. K. HOMOMIXER (made by Tokushu Kika Kogyo Co., Ltd.). However, this method is disadvantageous in that it is impossible to generate the shearing force sufficient for preparation of a uniform and stable emulsion, and an undesirable separation is apt to occur. Therefore, emulsification using emulsifiers having greater mechanical emulsifying forces than those of homomixers, for example, colloid mills and various homogenizers, has been tried.

In case of a colloid mill (made by APV Gaulin Inc.), the mill is so designed that refining of particles may be achieved by a shearing force generated when an emulsion injected by application of high pressures passes through the space between the slits which are pressed by a strong spring. Pulsative injection of the emulsion, however, results in a non-uniform slit distance and accordingly prevents preparation of an emulsion having substantially uniform particle sizes.

Homogenizers having a high-speed rotating disc and fine slits, on the other hand, make it possible to attain particles having some degree of fineness. Restrictions in the rotating speed of the disc and the slit distance, however, prevent preparation of substantially uniform, fine particles. These mechanical processes can not accurately control the particle size and thus do not give particles of desired particle size.

As described above, the conventional methods of emulsion polymerization fail to obtain fine polymer particles having excellent heat resistance and solvent resistance. Neither grinding nor suspension polymerization gives fine polymer particles of substantially uniform particle size.

One effective method proposed so far is manufacture of fine polymer particles having excellent heat resistance and a narrow particle size distribution disclosed by the applicant of the present invention. This method prepares an emulsion of fine particles by vigorously colliding an unstable emulsion of polycyclic-aromatic epoxy ester, such as a bisphenol-type epoxy ester, phenol novolac-type epoxy ester or cresol novolac-type epoxy esters under high pressure with MICROFLUIDIZER (made by Microfluidics Corporation) or NANOMIZER (made by Nanomizer Inc.), and polymerizes this emulsion (Japanese Patent Application Laid-Open No. 7-133328).

This method, however, requires an additional process of preparing a stable emulsion and a powerful, rather special emulsifier for that purpose, thereby having disadvantages of productivity and cost.

SUMMARY OF THE INVENTION

In view of the foregoing, an object of the present invention is to provide fine polymer particles prepared by a customarily used polymerization process without requiring any cost-consuming special emulsification and having a sharp particle size distribution and excellent heat resistance and solvent resistance, as well as a stable aqueous or alcoholic dispersion of such fine polymer particles and a novel epoxy ester used as an intermediate material therefor.

The inventors have intensively studied to solve the above problems and found that fine particles of high heat resistant polymer having a desired combination of physical properties (i.e., a high degree of crosslinking due to the use of a sufficient content of a crosslinking agent, high heat resistance peculiar to epoxy esters, superior solvent resistance, uniform particle size distribution through emulsion polymerization or seeded polymerization in the absence of a water-insoluble inorganic material as a dispersion stablizer, and good affinity for resins due to the presence of ester group and hydroxyl group) can be prepared by emulsion polymerization or seeded polymerization at least one monomer having at least one unsaturated double bond and at least one epoxy ester prepared by adding at least one unsaturated monobasic acid to at least one epoxide having one monocyclic hydrocarbon group and/or at least one epoxide having at least one cycloaliphatic epoxy group, in place of heretofore used epoxy esters having two or more aromatic hydrocarbon rings, such as bisphenol-type epoxy esters, phenol novolac-type epoxy esters, or cresol novolac-type epoxy esters.

The present invention is directed to fine particles of high heat resistant polymer obtained by emulsion polymerization or seeded polymerization at least one epoxy ester (C) having two or more unsaturated bonds in one molecule and at least one reactive monomer (D) having at least one unsaturated double bond in one molecule in the absence of a water-insoluble inorganic material as a dispersion stablizer, said epoxy ester (C) being obtained by adding at least one unsaturated monobasic acid (B) to at least one epoxide (A-1) having at least one glycidyl group and one monocyclic hydrocarbon group in one molecule, and/or at least one epoxide (A-2) having at least one cycloaliphatic epoxy group in one molecule. The invention is also directed to an aqueous or alcoholic dispersion of such high heat resistant fine polymer particles, and to an epoxy ester represented by the following formula (1) given below:

(1)

(where one of $X^1$ and $X^2$ represents —OH while the other represents:

(where $R^1$ represents H or $CH_3$—); one of $Y^1$ and $Y^2$ represents —OH while the other represents:

(where $R^2$ represents H or $CH_3$—); Z represents —O— or:

and represents a benzene ring or a cyclohexane ring, which may be optionally substituted by one or more lower alkyl groups or optionally includes one or more double bonds.

The epoxy ester used in the present invention is prepared by a known production process, that is, through reaction of an epoxide with an unsaturated monobasic acid, in the presence of a catalyst or a polymerization inhibitor according to the requirements.

DETAILED DESCRIPTION OF THE PREFERRED EMBODIMENTS

The epoxide (A-1) used in the present invention has at least one glycidyl group in one molecule and a monocyclic hydrocarbon group. The monocyclic hydrocarbons are preferably monocyclic hydrocarbons of three-membered through seven-membered rings, and more preferably those of six-membered ring. The most preferable epoxides includes any one of a benzene ring, a cyclohexane ring, a cyclohexene ring, and a cyclohexadiene ring. Examples of benzene ring-containing epoxides include phenyl glycidyl ether methylvinylamide, phenyl glycidyl ester methylvinylamide, catechol diglycidyl ether, resorcinol diglycidyl ether, hydroquinone diglycidyl ether, diglycidyl phthalate, diglycidyl isophthalate, diglycidyl terephthalate, pyrogallol triglycidyl ether, phloroglucinol triglycidyl ether, diglycidyl aniline, triglycidyl-o-aminophenol, triglycidyl-m-aminophenol, triglycidyl-p-aminophenol, tetraglycidyl-o-xylenediamine, tetraglycidyl-m-xylenediamine, tetraglycidyl-p-xylenediamine, etc. Also applicable are compounds having both a glycidyl ester and a glycidyl ether in one molecule, for example, compounds represented by glycidyl ether glycidyl salicyloylate. Examples of cyclohexane ring-containing epoxides include cyclohexane glycidyl ether methylvinylamide, cyclohexane glycidyl ester methylvinylamide, cyclohexane-o-dimethanol diglycidyl ether, cyclohexane-m-dimethanol diglycidyl ether, cyclohexane-p-dimethanol diglycidyl ether, cyclohexane-o-diglycidyl ether, cyclohexane-m-diglycidyl ether, cyclohexane-p-diglycidyl ether, diglycidyl hexahydrophthalate, diglycidyl hexahydroisophthalate, diglycidyl hexahydroterephthalate, tetraglycidylbisaminomethylcyclohexane, etc. Also applicable are compounds having both a glycidyl ester and a glycidyl ether in one molecule, for example, compounds represented by glycidyl ether glycidyl hexahydrosalicyloylate. Examples of cyclohexene ring-containing epoxides include cyclohexene glycidyl ether methylvinylamide, cyclohexene glycidyl ester methylvinylamide, cyclohexene diglycidyl ether, diglycidyl tetrahydrophthalate, etc. Also applicable are compounds having both a glycidyl ester and a glycidyl ether in one molecule, for example, compounds represented by glycidyl ether glycidyl tetrahydrosalicyloylate. Examples of cyclohexadiene ring-containing epoxides include cyclohexadiene glycidyl ether methylvinylamide, cyclohexadiene glycidyl ester methylvinylamide, 1,3-cyclohexadiene-5,6-diglycidyl ether, 1,3-cyclohexadiene-5,6-diglycidyl ester, 1,4-cyclohexadiene-3,6-diglycidyl ether, 1,4-cyclohexadiene-3,6-diglycidyl ester, etc.

One or more halogens or lower alkyl substituents may be introduced into the benzene ring, cyclohexane ring, cyclohexene ring, or cyclohexadiene ring of these epoxides.

The epoxide (A-2) used in the present invention has at least one cycloaliphatic epoxide in one molecule and optionally includes one or more glycidyl groups, ethylene oxides, or reactive unsaturated double bonds. As preferable examples of the epoxide (A-2) used in the present invention are as follows: epoxides having two or more cycloaliphatic epoxy groups, such as alicyclic diepoxy acetal represented by the following formula:

alicyclic diepoxy adipate represented by the following formula:

alicyclic diepoxy carboxylate represented by the following formula:

dicyclopentadiene dioxide represented by the following formula:

epoxides having an cycloaliphatic epoxide and ethylene oxide, such as vinyl cyclohexene dioxide represented by the following formula:

epoxides having an cycloaliphatic epoxide and a vinyl group, such as vinyl cyclohexene monoxide represented by the following formula:

epoxides having an cycloaliphatic epoxide and a reactive double bond, represented by cyclohexene oxide (meth)acrylate and cyclohexene oxide methyl(meth)acrylate, each represented by the following formulae:

epoxides having an cycloaliphatic epoxide and glycidyl, such as cyclohexene oxide glycidyl ether and cyclohexene oxide glycidyl ester, each represented by the following formulae:

, etc. One or more halogens or lower alkyl groups may be introduced into the cyclohexane ring of these epoxides.

The epoxide (A-1) and (A-2) preferably have a molecular weight of 100 through 2,000, or more specifically 100 through 1,000. The above epoxides (A-1) and (A-2) may be used alone or in combination. Bisphenol, phenol novolac, or cresol novolac epoxy resins may also be mixed with such epoxides, so long as they do not have adverse affect.

Examples of the unsaturated group-containing monobasic acid (B) used in the present invention include (meth)acrylic acid, crotonic acid, cinnamic acid, sorbic acid; and half-esters of maleic acid with methanol, ethanol, 2-hydroxyethyl (meth)acrylate, 2-hydroxypropyl (meth)acrylate, dicyclopentadiene, or the like. Especially preferable are acrylic acid, and methacrylic acid. Throughout the specification, the term "(meth)acrylate" is used to mean acrylate and methacrylate and the term "(meth)" is used in a similar meaning. One or any mixture of these compounds may be used.

The epoxy esters (C) used in the present invention are reaction products of the epoxide(s) (A-1) and/or (A-2) and the unsaturated monobasic acid(s) (B) and have two or more unsaturated double bonds. These epoxy esters may be used singly or in combination thereof and, further, may be used in combination with an acid-modified compound in which OH groups of the epoxy ester (C) are partially modified with phthalic anhidride, tetrahydrophthalic anhydride, succinic anhydride, maleic anhydride, etc. Further, bifunctional compounds like glycidyl (meth)acrylate or allyl glycidyl ether may be mixed with the epoxy ester (C). Among the epoxy esters used in the production of the fine particles of high heat resistant polymer according to the present invention, the epoxy esters represented by the above formula (1) may be mentioned as especially preferable ones and a series of such epoxy esters per se are novel compounds and are included in the present invention. Examples of such esters are as follows:

-continued $$CH_2=C(CH_3)-C(=O)-O-CH_2-CH(OH)-CH_2-O-C(=O)-[cyclohexane-H]-C(=O)-O-CH_2-CH(OH)-CH_2-O-C(=O)-C(CH_3)=CH_2$$

$$CH_2=CH-C(=O)-O-CH_2-CH(OH)-CH_2-O-C(=O)-[cyclohexane-H]-C(=O)-O-CH_2-CH(OH)-CH_2-O-C(=O)-CH=CH_2$$

$$CH_2=C(CH_3)-C(=O)-O-CH_2-CH(OH)-CH_2-O-C(=O)-[cyclohexane-H(1,4)]-C(=O)-O-CH_2-CH(OH)-CH_2-O-C(=O)-C(CH_3)=CH_2$$

$$CH_2=CH-C(=O)-O-CH_2-CH(OH)-CH_2-O-C(=O)-[cyclohexane-H(1,4)]-C(=O)-O-CH_2-CH(OH)-CH_2-O-C(=O)-CH=CH_2$$

$$CH_2=C(CH_3)-C(=O)-O-CH_2-CH(OH)-CH_2-O-C(=O)-[cyclohexane-H]-C(=O)-O-CH_2-CH(OH)-CH_2-O-C(=O)-C(CH_3)=CH_2$$

$$CH_2=CH-C(=O)-O-CH_2-CH(OH)-CH_2-O-C(=O)-[cyclohexane-H]-C(=O)-O-CH_2-CH(OH)-CH_2-O-C(=O)-CH=CH_2$$

$$CH_2=C(CH_3)-C(=O)-O-CH_2-CH(OH)-CH_2-O-C(=O)-[C_6H_4]-C(=O)-O-CH_2-CH(OH)-CH_2-O-C(=O)-C(CH_3)=CH_2$$

$$CH_2=CH-C(=O)-O-CH_2-CH(OH)-CH_2-O-C(=O)-[C_6H_4]-C(=O)-O-CH_2-CH(OH)-CH_2-O-C(=O)-CH=CH_2$$

$$CH_2=C(CH_3)-C(=O)-O-CH_2-CH(OH)-CH_2-O-C(=O)-[C_6H_4\text{-}ortho]-C(=O)-O-CH_2-CH(OH)-CH_2-O-C(=O)-C(CH_3)=CH_2$$

$$CH_2=CH-C(=O)-O-CH_2-CH(OH)-CH_2-O-C(=O)-[C_6H_4\text{-}ortho]-C(=O)-O-CH_2-CH(OH)-CH_2-O-C(=O)-CH=CH_2$$

$$CH_2=C(CH_3)-C(=O)-O-CH_2-CH(OH)-CH_2-O-C(=O)-[C_6H_4]-C(=O)-O-CH_2-CH(OH)-CH_2-O-C(=O)-C(CH_3)=CH_2$$

-continued

Examples of the reactive monomer (D) having at lest one vinyl group in one molecule used in the present invention include: unsaturated fatty acids, such as (meth)acrylic acid, itaconic acid, cronotic acid, fumaric acid, maleic acid, and maleic anhydride; unsaturated fatty esters, such as glycidyl (meth)acrylate, methyl (meth)acrylate, ethyl (meth)acrylate, propyl (meth)acrylate, butyl (meth)acrylate, and 2-ethylhexyl (meth)acrylate; and dodecyl (meth)acrylate; nitrogen-containing monomers, such as (meth)acrylamide, (meth)acrylonitrile, N-methylol(meth)acrylamide, diacetone (meth)acrylamide, and diethylaminoethyl(meth)acrylamide; aliphatic vinyls, such as vinyl chloride, propene, and butene; aromatic vinyls, such as styrene, vinyltoluene and p-t-butylstyrene; etc. Besides the above mentioned compounds, reactive monomers (D) having two or more polymerizable double bonds in one molecule may be used. Examples of such reactive monomer (D) having two or more polymerizable double bonds in one molecule include: non-conjugated divinyl compounds, such as divinyl benzene; polyfunctional (meth)acrylates, such as ethylene glycol di(meth)acrylate, 1,4-butanediol di(meth)acrylate, 1,6-hexanediol di(meth)acrylate, allyl (meth)acrylate, trimethylolpropane tri(meth)acrylate, and pentaerythritol tri(meth)acrylate. These reactive monomers work as a co-crosslinking agent, etc., and may be used singly or in combination thereof.

The fine polymer particles of the present invention preferably include 80% or less by weight of the reactive monomer (D) not containing a co-crosslinking agent. In other words, the polymer particles preferably include 20% through 100% by weight of the crosslinking epoxy ester (C) and the co-crosslinking agent. When the content of the crosslinking epoxy ester (C) and the co-crosslinking agent is less than 20% by weight, a practical high heat resistance cannot be achieved.

Examples of surfacant applicable for polymerization to produce the fine polymer particles of the present invention are: anionic surfactants including fatty acid salts, such as sodium laurate (and potassium laurate: hereinafter sodium compounds represent both sodium and potassium compounds) and sodium oleate, sulfonates, such as sodium alkanesulfonates, sodium dialkylsulfosuccinates, sodium dialkyl diphenyl ether disulfonates, sodium alkylbenzenesulfonates, and sodium alkylnaphthalenesulfonates, and sulfates, such as sodium alkylsulfates, sodium polyoxyethylene alkyl ether sulfates, and sodium polyoxyethylene alkyl phenyl ether sulfates; nonionic surfactants, such as polyoxyethylene lauryl ether, polyoxyethylene oleyl ether, polyoxyethylene octyl phenyl ether, and polyoxyethylene nonyl phenyl ether; and cationic surfactants, such as alkyltrimethylammonium chlorides and dialkyldimethylammonium chlorides. These surfactants may be used alone or in mixture thereof. In addition, synthetic polymer compounds including various homopolymers, copolymers, graft polymers and block polymers; sorbitan esters; natural polymer compounds; and derivatives thereof may also be used. Specifically, there may be mentioned polyvinyl pyrrolidone, polyvinyl methyl ether, polyethylene-imine, polyacrylates, vinyl alcohol-vinyl acetate copolymers, ethyl cellulose, hydroxypropyl cellulose, sorbitan stearic monoesters, etc.

Examples of radical polymerization initiator applicable for polymerization to produce the fine polymer particles of the present invention include: organic peroxides, such as benzoyl peroxide, lauroyl peroxide, and cumene hydroperoxide; azo compounds, such as 2,2'-azobisisobutyronitrile and 2,2'--azobis(2,4'-dimethylvaleronitrile); inorganic peroxides, such as persulfates, hydrogen peroxide, and permanganates; and water-soluble redox initiators of the above inorganic peroxides and reducing agents like sulfites, metasulfites, hydrosulfites, bisulfites, and iron salts.

In the production of the fine polymer particles according to the present invention, the epoxy ester(s) (C) which has two or more unsaturated bonds in one molecule and has been obtained by adding at least one unsaturated monobasic acid (B) to at least one epoxide (A-1) having at least one glycidyl group in one molecule and a monocyclic hydrocarbon group and/or at least one epoxide (A-2) having at least one cycloaliphatic epoxy group in one molecule, is used as a crosslinking monomer or oligomer, in place of a polycyclic-aromatic epoxy ester heretofore used. The use of such an epoxy ester facilitates a stable, homogeneous emulsion in water or an alcoholic polymerization medium without requiring collisions under high pressures or high shearing forces. Such a stable emulsion makes it easy to produce the fine polymer particles of the present invention through known emulsion polymerization or seeded polymerization. The fine polymer particles thus obtained satisfy the required heat resistance and solvent resistance.

As described above, since by the selection of an appropriate epoxy ester, the polymerization to produce the inventive fine polymer particles can be conducted under a sufficiently dispersed condition in a polymerization medium, the method of the invention does not require forcible, mechanical emulsification of monomers or crosslinking oligomers into the medium. Dispersions emulsified with a homogenizer, like T.K. HOMOMIXER, a colloid mill, MICROFLUIDIZER, or NANOMIZER, may be used for emulsion polymerization or seeded polymerization.

Emulsion polymerization and seeded polymerization generally carried out in the absence of a water-insoluble inorganic dispersion stabilizer, in aqueous media are especially suited for producing the fine polymer particles of the present invention. These methods give fine polymer particles having excellent heat resistance and solvent resistance and high monodispersibility (that is, having substantially uniform particle sizes), and stable emulsions of such fine polymer particles.

The polymer emulsions obtained as above are dried and used as powder. Applicable processes for drying are a spray drying method typically with a spray dryer, a method of applying the emulsion on a heated rotary drum like a drum dryer, a freeze-drying method, etc. The fine particles thus obtained have a particle size (by weight average) ranging from 0.01 to 10 $\mu$m, preferably from 0.01 to 3 $\mu$m, and more preferably from 0.03 to 3 $\mu$m, and a ratio Dw/Dn of a weight-average particle size Dw to a number-average particle size Dn being not greater than 5, preferably not greater than 2, and more preferably not greater than 1.5.

The fine polymer particles obtained in the present invention have favorable emulsion stability and excellent heat resistance and solvent resistance. The temperature at which the weight loss by 10% in thermogravimetric analysis (TGA) is at least not less than 250° C., preferably not less than 300° C., and more preferably not less than 330° C.

The invention is described more in detail according to some examples, although the invention is hot limited to these examples in any sense. In the following description, the term 'parts' represents parts by weight, unless otherwise specified.

EXAMPLE 1

Figure 1:
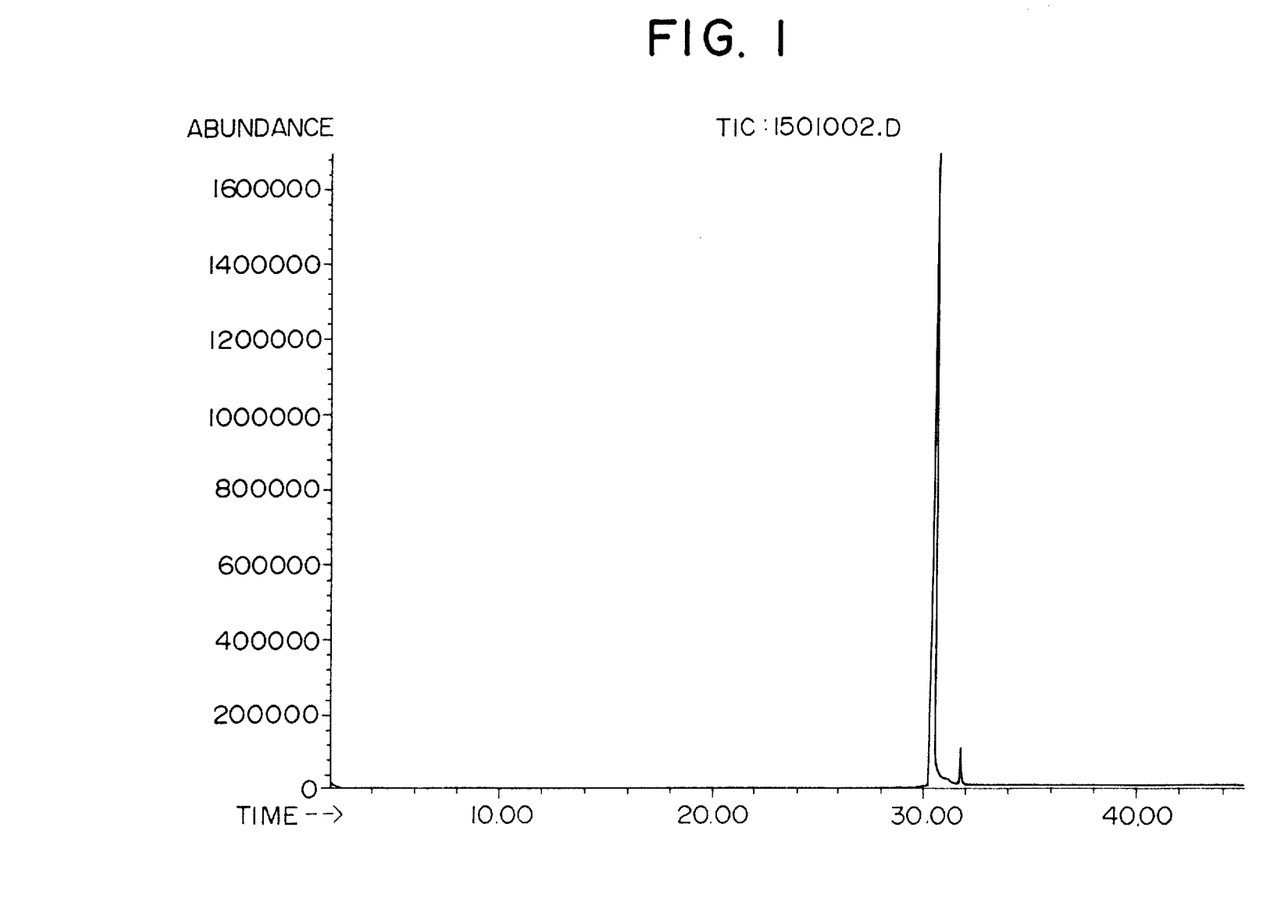
FIG. 1 is a gas chromatograph showing an epoxy ester (Example 1) according to the invention.
Figure 2:
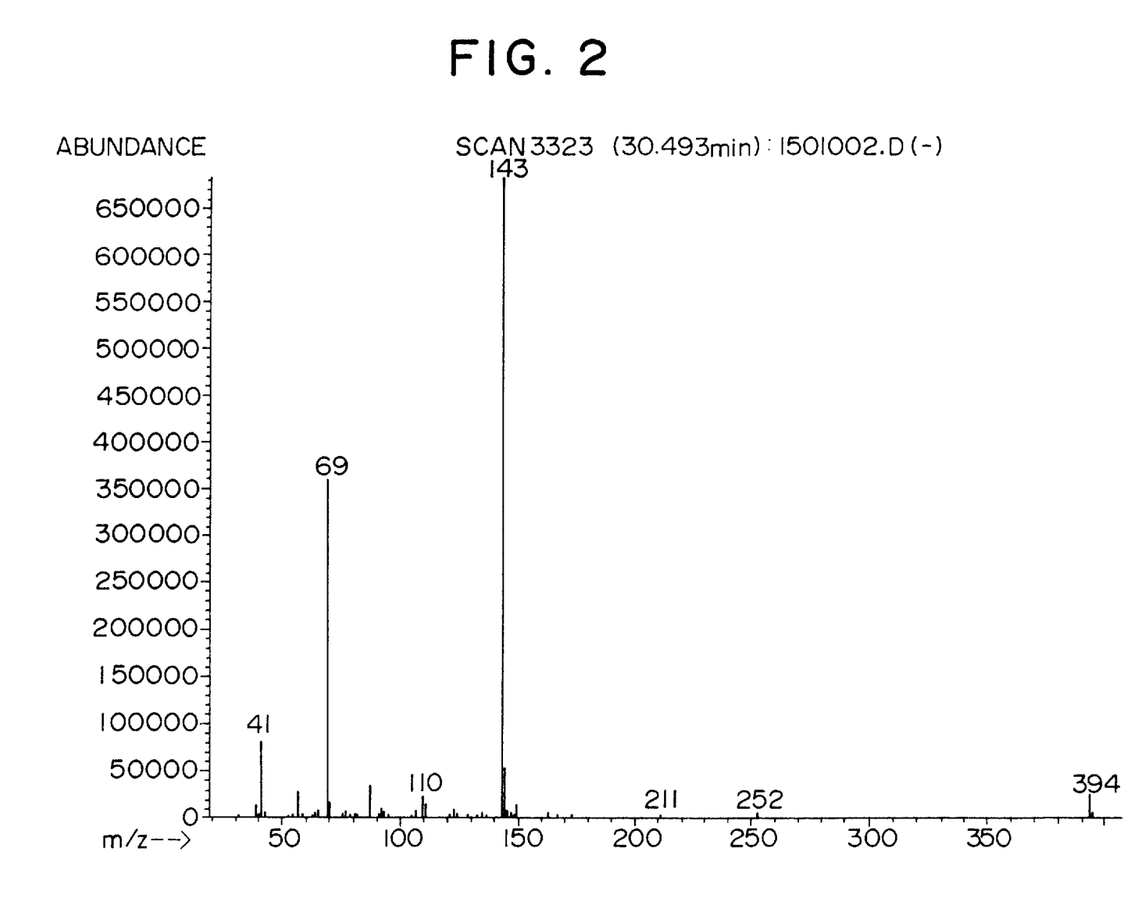
FIG. 2 is a mass spectrograph showing the epoxy ester (Example 1).
Figure 3:
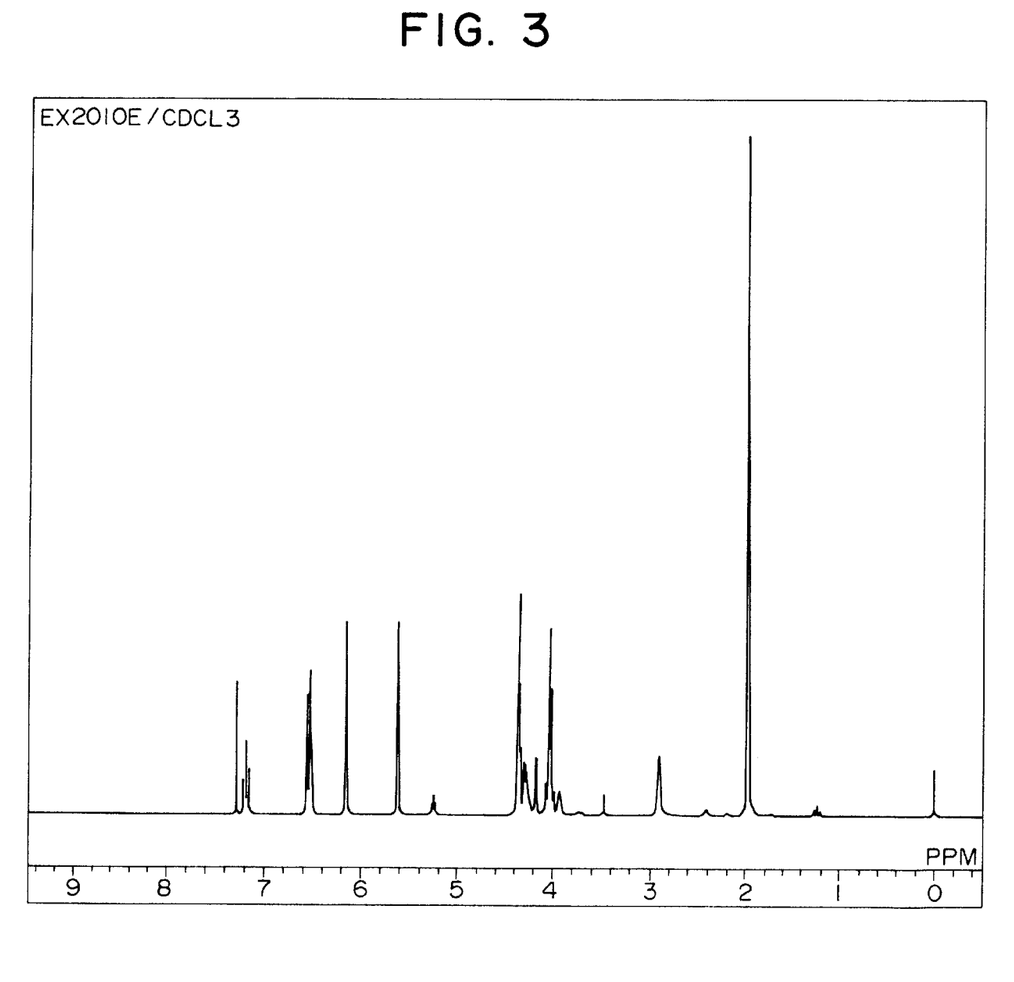
FIG. 3 is an NMR spectrum showing the epoxy ester (Example 1).

222 parts of an epoxy resin: resorcinol diglycidyl ether (DENACOL EX201; epoxy equivalent weight: 111, made by Nagase Chemicals, Ltd.), 172 parts of methacrylic acid, 0.2 parts of hydroquinone, and 1.0 part of dimethylbenzylamine were charged into a flask and reaction was carried out at 110° C. while small quantities of air was blown into the flask, until the acid value lowered to 1 or below. An epoxy ester thus obtained was identified: FIGS. 1 and 2 respectively show a gas chromatograph and a mass spectrograph of the epoxy ester; and FIG. 3 is an NMR spectrum. As clearly shown in FIG. 3, the epoxy ester had a peak (1.9–2.0 ppm) ascribed to $CH_3$ of $CH_2=C(CH_3)COO-$, a peak (2.9 ppm) ascribed to $-CH-$ bonding to OH, and peaks (5.6 ppm and 6.2 ppm) ascribed to $CH_2=$ of $CH_2=C(CH_3)-$.

Based on these results, the epoxy ester was identified as resorcinol diglycidyl ether dimethacrylate represented by the formula (2) given below:

Existence of a peak (5.2 ppm) ascribed to $-CH-$ bonding to $CH_2=C(CH_3)COO-$ showed by-production of resorcinol diglycidyl ether dimethacrylate including a structure represented by the formula (3) given below, in addition to the epoxy ester represented by the formula (2). (The molar ratio of the by-product was approximately 29 with respect to 100 of the epoxy ester represented by the formula (2), based on calculation of the area ratio of the peaks observed at 2.9 ppm and 5.2 ppm. This by-product epoxy ester was also applicable for manufacturing the fine polymer particles of the invention.)

Production Example 1

A resin A containing 50% of non-volatile component was prepared by adding 394 parts of styrene monomer to the epoxy ester thus obtained with vigorous stirring.

Production Example 2

A resin B containing 70% of non-volatile component was prepared in the same manner as Production Example 1, except that 169 parts of styrene monomer was added.

EXAMPLE 2

Figure 4:
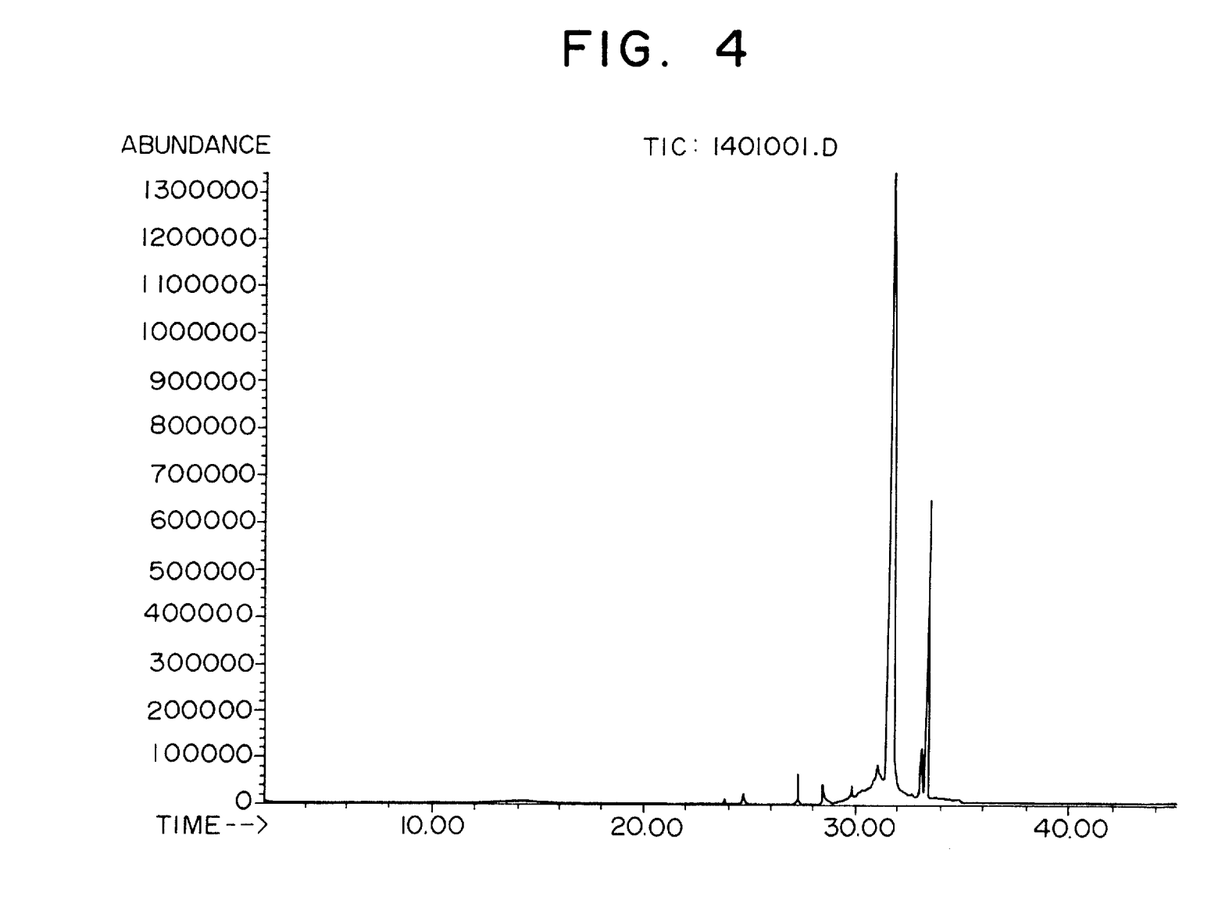
FIG. 4 is a gas chromatograph showing another epoxy ester (Example 2) according to the invention.
Figure 5:
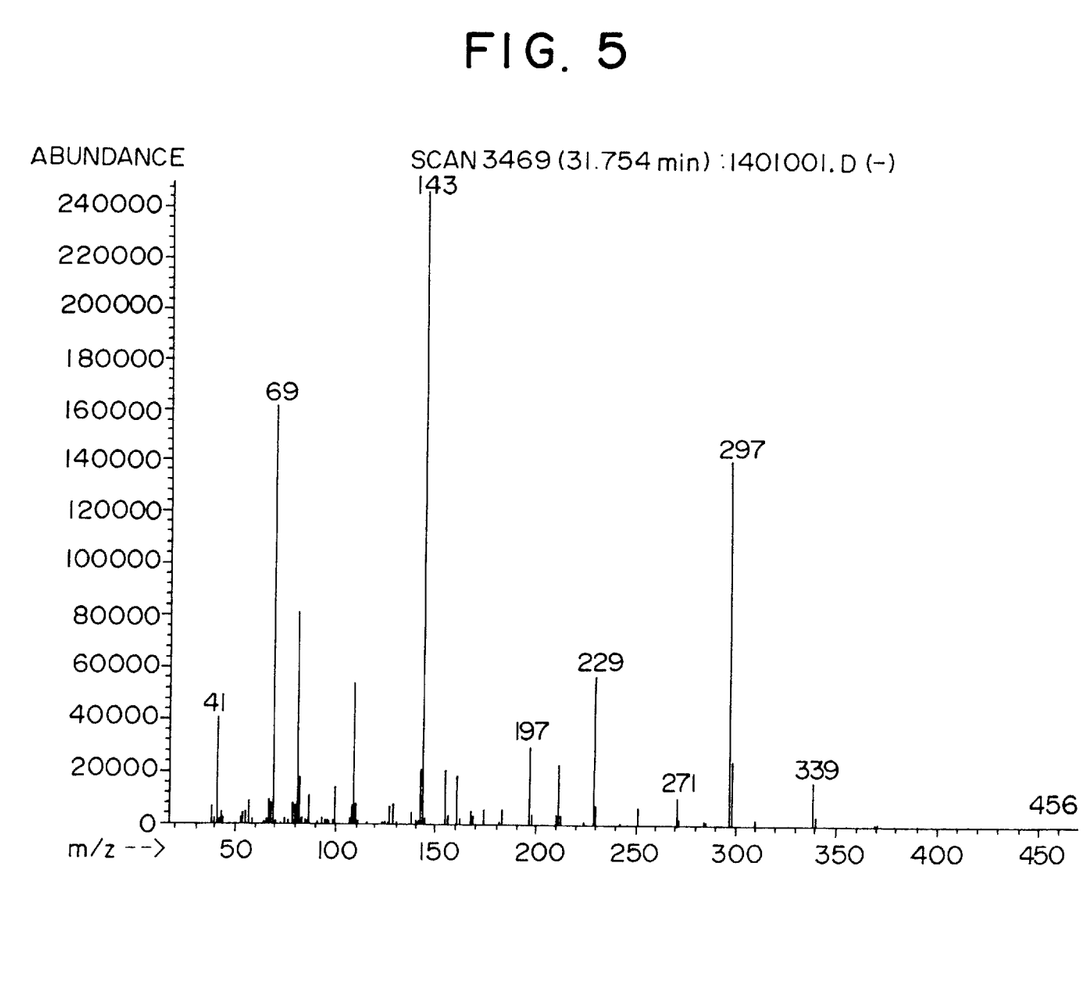
FIG. 5 is a mass spectrograph showing the epoxy ester (Example 2).
Figure 6:
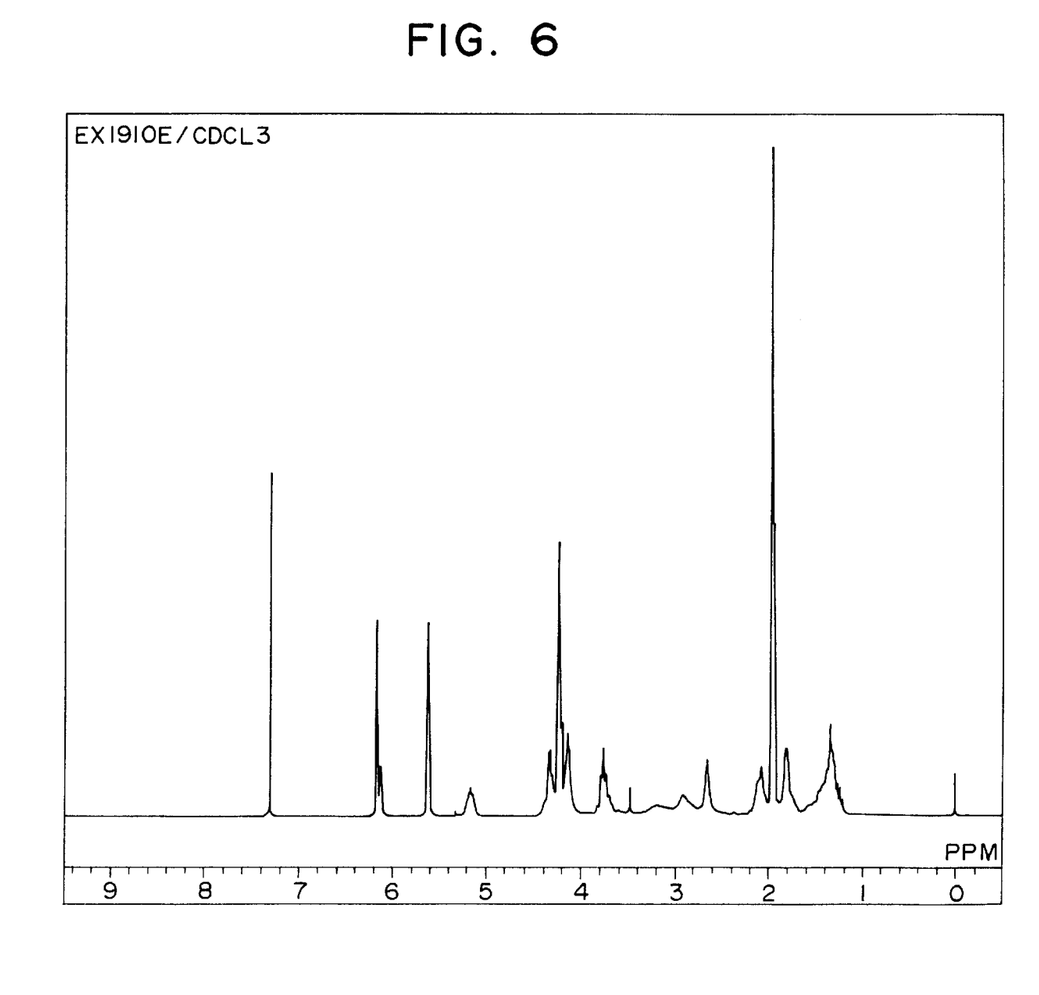
FIG. 6 is an NMR spectrum showing the epoxy ester (Example 2).

344 parts of an epoxy resin: diglycidyl hexahydrophtalate (EPIKOTE 191P; epoxy equivalent weight: 172, made by Yuka Shell Epoxy Kabushiki Kaisha), 172 parts of methacrylic acid, 0.2 parts of hydroquinone, and 1.0 part of dimethylbenzylamine were charged into a flask and reaction was carried out at 110° C. while small quantities of air was blown into the flask, until the acid value lowered to 1 or below. An epoxy ester thus obtained was identified: FIGS. 4 and 5 respectively show a gas chromatograph and a mass spectrograph of the epoxy ester; and FIG. 6 is an NMR spectrum. As clearly shown in FIG. 6, the epoxy ester had a peak (1.9–2.0 ppm) ascribed to $CH_3$ of $CH_2=C(CH_3)COO-$, a peak (3.8 ppm) ascribed to $-CH-$ bonding to OH, and peaks (5.6 ppm and 6.2 ppm) ascribed to $CH_2=$ of $CH_2=C(CH_3)-$.

Based on these results, the epoxy ester was identified as hexahydrophthalic acid diglycidyl ester dimethacrylate represented by the formula (4) given below:

Existence of a peak (5.2 ppm) ascribed to —CH— bonding to CH$_2$=C(CH$_3$)COO— showed by-production of hexahydrophthalic acid diglycidyl ester dimethacrylate including a structure represented by the formula (5) given below, in addition to the epoxy ester represented by the above formula (4). (The molar ratio of the by-product was approximately 73 with respect to 100 of the epoxy ester represented by the formula (4), based on calculation of the area ratio of the peaks observed at 3.8 ppm and 5.2 ppm. This by-product epoxy ester was also applicable for manufacturing the fine polymer particles of the invention.)

Production Example 3

A resin C containing 50% of non-volatile component was prepared by adding 516 parts of styrene monomer to the epoxy ester thus obtained with vigorous stirring.

Production Example 4

A resin D containing 70% of non-volatile component was prepared in the same manner as Production Example 3, except that 221 parts of styrene monomer was added.

Production Example 5

318 parts of an epoxy resin: cyclohexanedimethanol diglycidyl ether (MK-107; epoxy equivalent: 159, made by ACI Japan Ltd.), 172 parts of methacrylic acid, 0.2 parts of hydroquinone, and 1.0 part of dimethylbenzylamine were charged into a flask and reaction was carried out at 110° C. while small quantities of air was blown into the flask, until the acid value lowered to 1 or below. This gave an epoxy ester, which was subsequently mixed with 490 parts of styrene monomer with vigorous stirring to yield a resin E containing 50% of non-volatile component.

Production Example 6

A resin F containing 70% of non-volatile component was prepared in the same manner as Production Example 5, except that 210 parts of styrene monomer was added.

EXAMPLE 3

After 157 parts of deionized water, 0.02 parts of NEOCOL P (made by Dai-ichi Kogyo Seiyaku Co., Ltd.), 3.0 parts of methyl methacrylate, and 2.7 parts of a 2% aqueous solution of potassium persulfate were set in a 2 L separable flask, the mixture was stirred at 70° C. in an atmosphere of nitrogen for 30 minutes. At an elevated reaction temperature of 90° C., an emulsified solution containing 297 parts of the resin A manufactured in Production Example 1, 1 part of NEOCOL P, and 500 parts of deionized water was added dropwise to the mixture over 6 hours for polymerization, while 53 parts of a 2% aqueous solution of potassium persulfate was simultaneously added dropwise. After conclusion of the dropwise addition, the mixture was further stirred for 2 hours. The conversion in this polymerization reaction was 98%. Fine polymer particles thus obtained were measured by a particle size measuring device LPA 3000/3100 (made by Otsuka Electronics Co., Ltd.) taking advantage of dynamic light scattering.

EXAMPLES 4–8

Emulsions of fine polymer particles were prepared in the same manner as Example 3, except that the resin B (Example 4), the resin C (Example 5), the resin D (Example 6), the resin E (Example 7) and the resin F (Example 8) were used respectively in place of the resin A in Example 3.

EXAMPLE 9

The polymer emulsions obtained in Examples 3 through 8 were dried with a spray dryer Type L8 (made by Ohkawara Kakohki Co., Ltd.) to yield fine polymer particles. The fine polymer particles obtained were observed by a scanning electron microscope, which showed true spherical particles having high monodispersibility and a mean particle size of 0.5 $\mu$m (coefficient of variation of the particle size distribution (CV) within 10%).

Comparative Example 1

Polymerization was carried out in the same manner as Example 3 except that a styrene resin solution G (content of non-volatile component: 50%) of methacrylic acid-addition product of bisphenol A epoxy resin (EPOTOHTO YD128: made by Tohto Kasei Co., Ltd.) was used in place of the resin A in Example 3. A large quantity of aggregates were generated in the course of polymerization and interfered with stirring. The aggregates were observed by scanning electron microscope, which showed no fine particles but only coagulation.

Comparative Example 2

Polymerization was carried out in the same manner as Example 3, except that a resin H (content of non-volatile component: 30%) which had been produced by changing the content of the non-volatile component of the resin G in Comparative Example 1. A large quantity of aggregates were also generated in the course of polymerization.

Comparative Example 3

Polymerization was carried out in the same manner as Example 3 except that a styrene resin solution I (content of non-volatile component: 50%) of methacrylic acid-addition product of phenol novolac epoxy resin (EPOTOHTO YDPN638: made by Tohto Kasei Co., Ltd.) was used in place of the resin A in Example 3. The emulsified solution was geled in the course of polymerization like Comparative Example 1.

The particles obtained were evaluated for solvent resistance and heat resistance according to the methods described below. The results of evaluation are shown in Table 1.
(Solvent resistance)

The fine particles obtained in Examples 3 through 9 (0.5 g) were dispersed respectively in 50 ml of each of ethyl acetate, toluene, and tetrahydrofuran (THF). The dispersions were left at 25° C. for 48 hours and then air-dried for measurement of the degree of weight increase. (Heat resistance)

The fine particles obtained in Examples 3 through 9 (0.01 g) were heated at a temperature rise rate of 10° C./min in a stream of nitrogen, and a temperature resulting in a weight loss of 10% was measured with TGA 7 (thermogravimetric analyzer made by Perkin-Elmer Corporation).

TABLE 1

|  | Examples | | | | | | Comparative Examples | | |
| --- | --- | --- | --- | --- | --- | --- | --- | --- | --- |
|  | 3 | 4 | 5 | 6 | 7 | 8 | 1 | 2 | 3 |
| Resin | A | B | C | D | E | F | G | H | I |
| Epoxy ester content (% by weight) | 50 | 70 | 50 | 70 | 50 | 70 | 50 | 30 | 50 |
| Conversion (%) | 98 | 97 | 97 | 97 | 98 | 96 | — | — | — |
| Polymerization stability*1 | ○ | ○ | ○ | ○ | ○ | ○ | x | x | x |
| Weight-average particle size (μm)*2 | 0.52 | 0.55 | 0.53 | 0.51 | 0.54 | 0.52 | — | — | — |
| Dw/Dn | 1.03 | 1.05 | 1.03 | 1.03 | 1.04 | 1.05 | — | — | — |
| Mean particle size (μm)*3 | 0.5 | 0.5 | 0.5 | 0.5 | 0.5 | 0.5 | — | — | — |
| Coefficient of variation (%) | 6 | 8 | 7 | 9 | 6 | 9 | — | — | — |
| Solvent resistance: | | | | | | | | | |
| Percentage of weight increase (%)  Ethyl acetate | 0.8 | 0.3 | 0.4 | 0.3 | 0.6 | 0.5 | — | — | — |
| Toluene | 0.8 | 0.6 | 0.7 | 0.4 | 0.8 | 0.6 | — | — | — |
| THF | 1.0 | 0.6 | 0.9 | 0.5 | 1.0 | 0.9 | — | — | — |
| Heat resistance: | | | | | | | | | |
| Temperature of 10% weight loss (°C.) | 402 | 390 | 386 | 360 | 382 | 380 | — | — | — |
| Tg (DSC) (°C.) | 155 | 165 | 145 | 160 | 140 | 150 | — | — | — |

*1: presence of aggregates in polymer
○: not exist
x: generation of a large quantity of aggregates or gelation
*2: Dynamic light scattering: LPA 3000/3100
*3: Observation by scanning electron microscope Production Example 7

420 parts of cyclohexeneoxidemethyl methacrylate (3,4-epoxycyclohexylmethyl methacrylate): CYCLOMER M-100 (epoxy equivalent: 210, made by Daicel Chemical Ind., Ltd.), 172 parts of methacrylic acid, 0.03 parts of hydroquinone, and 0.2 parts of dimethylbenzylamine were charged into a flask and reaction was carried out at 100° C. while small quantities of air was blown into the flask, until the acid value lowered to 1 or below. This gave an epoxy ester, which was subsequently mixed with 1,381 parts of styrene monomer with vigorous stirring to yield a resin J containing 30% of non-volatile component.

Production Example 8

A resin K containing 50% of non-volatile substance was prepared in the same manner as Production Example 7, except that 592 parts of styrene monomer was added.

Production Example 9

1,048 parts of alicyclic diepoxy carboxylate (3,4-epoxycyclohexylmethyl-(3,4-epoxy)cyclohexane carboxylate): CELOXIDE 2021 (epoxy equivalent: 131, made by Daicel Chemical Ind., Ltd.), 688 parts of methacrylic acid, 0.9 parts of hydroquinone, and 3.5 parts of benzyldimethylamine were charged into a flask and reaction was carried out at 100° C. while small quantities of air was blown into the flask, until the acid value lowered to 1 or below. This gave an epoxy ester, which was subsequently mixed with 1,736 parts of styrene monomer with vigorous stirring to yield a resin L containing 50% of non-volatile component.

Production Example 10

290 parts of alicyclic diepoxy acetal (3,4-epoxycyclohexyl-(3,4-epoxy)cyclohexane acetal): CY-175 (epoxy equivalent: 145, made by Ciba-Geigy Ltd.), 172 parts of methacrylic acid, 0.2 parts of hydroquinone, and 0.9 parts of benzyldimethylamine were charged into a flask and reaction was carried out at 100° C. while small quantities of air was blown into the flask, until the acid value lowered to 1 or below. This gave an epoxy ester, which was subsequently mixed with 462 parts of styrene monomer with vigorous stirring to yield a resin M containing 50% of non-volatile substance.

EXAMPLE 10

After 260 parts of deionized water, 0.05 parts of EMAL O (made by Kao Corporation), 4.5 parts of methyl methacrylate, and 4.5 parts of a 2% aqueous solution of potassium persulfate were set in a separable flask, the mixture was stirred at 70° C. in an atmosphere of nitrogen for 30 minutes. A solution containing 496 parts of the resin J manufactured in Production Example 7, 5 parts of EMAL O, and 600 parts of deionized water, which had emulsified by a disperser, was added dropwise to the mixture over 6 hours for polymerization, while 20 parts of a 4% aqueous solution of potassium persulfate was simultaneously added dropwise. After conclusion of the dropwise addition, the temperature was increased to 90° C. and the mixture was further stirred for 2 hours. The conversion in this polymerization reaction was 96%. Fine polymer particles thus obtained were measured by a particle size measuring device LPA 3000/3100 taking advantage of dynamic light scattering.

EXAMPLES 11–13

Aqueous dispersions of fine polymer particles were prepared in the same manner as Example 10, except that the resin K (Example 11), the resin L (Example 12), and the resin M (Example 13) were used respectively in place of the resin J in Example 10.

EXAMPLE 14

The aqueous polymer dispersions obtained in Examples 10 through 13 were dried with a spray dryer L8 (made by Ohkawara Kakohki, Co., Ltd.) to yield fine polymer particles. The fine polymer particles obtained were observed by a scanning electron microscope, which showed true spherical particles having high monodispersibility and mean particle size of 0.5 μm (Cv within 10%).

Comparative Example 4

A 1 mm thick slab-like substance of crosslinking polymer A was obtained by curing 100 parts of the resin J used in Example 10 mixed with 1.0 part of benzoyl peroxide. The slab-like substance was roughly ground with BANTAM MILL (made by Hosokawa Micron Corporation) and dry-ground with MICRON JET (made by Hosokawa Micron Corporation). The ground particles were observed by a scanning electron microscope, which showed particles having mean particle size of 12 μm with a very large particle size distribution, i.e., a CV of 90%.

Comparative Example 5

The resin K used in Example 11 was cured, roughly ground, and dry-ground in the same manner as Comparative below. The results of evaluation are shown in Table 2. (Solvent resistance)

The fine particles obtained in Example 14 (0.5 g) were dispersed respectively in 50 ml of each of ethyl acetate, toluene, and tetrahydrofuran (THF). The dispersions were left at 25° C. for 48 hours. The particle size was measured by a particle size measuring device LPA 3000/3100 (by a scanning electron microscope for Comparative Examples 4 and 5), and the rate of particle size increase was calculated. (Heat resistance)

The fine particles obtained in Example 14 (0.01 g) were heated at the temperature rise rate of 10° C./min in a stream of nitrogen, and the temperature giving a weight loss of 10% was measured with TGA7.

TABLE 2

|  | Examples | | | | Comparative Examples | | |
| --- | --- | --- | --- | --- | --- | --- | --- |
|  | 10 | 11 | 12 | 13 | 4 | 5 | 6 |
| Resin | J | K | L | M | J | K | SM/DVB |
| Epoxy ester content (% by weight) | 30 | 50 | 50 | 50 | 30 | 50 | 30 |
| Production method of fine particles*4 | Seed | Seed | Seed | Seed | Grinding | Grinding | Seed |
| Conversion (%) | 96 | 98 | 98 | 97 | — | — | — |
| Polymerization stability*1 | o | o | o | o | — | — | x |
| Weight-average particle size (μm)*2 | 0.56 | 0.55 | 0.49 | 0.51 | — | — | — |
| Dw/Dn | 1.04 | 1.05 | 1.03 | 1.04 | — | — | — |
| Mean particle size (μm)*3 | 0.5 | 0.5 | 0.5 | 0.5 | 12 | 2.5 | — |
| Coefficient of variation (%) | 8 | 9 | 10 | 8 | 90 | 60 | — |
| Solvent resistance: |  |  |  |  |  |  |  |
| Percentage of particle size increase (%)  Ethyl acetate | 0.3 | 0.4 | 0.2 | 0.4 | 0.3 | 0.3 | — |
| Toluene | 0.3 | 0.5 | 0.5 | 0.6 | 0.3 | 0.4 | — |
| THF | 0.5 | 0.7 | 0.5 | 0.8 | 0.4 | 0.8 | — |
| Heat resistance: |  |  |  |  |  |  |  |
| Temp. of 10% weight loss (%) | 366 | 390 | 347 | 360 | 370 | 392 | — |
| Tg (DSC) (°C.) | 169 | 180 | 169 | 175 | 170 | 180 | — |

In Comparative Example 6, the epoxy ester content is the amount of divinylbenzene.
*1: presence of aggregates in polymer
o: not exist
x: generation of a large quantity of aggregates or gelation
*2: Dynamic light scattering: LPA 3000/3100
*3: Observation by scanning electron microscope
*4: Seed: seeded polymerization
Grinding: grinding of slab-like resin article Example 4 before two-hour wet-grinding with ATOLITER S (Mitsui Miike engineering Corporation). The ground particles were observed by a scanning electron microscope, which showed particles having mean particle size of 2.5 μm with a very large particle size distribution, i.e., a CV of 60%.

Comparative Example 6

Polymerization was carried out in the same manner as Example 10 except that 347.2 parts of styrene monomer and 148.8 parts of divinyl benzene were used in place of 496 parts of the resin J in Example 10. A large quantity of aggregates were generated in the course of polymerization and interfered with further polymerization.

The particles obtained were evaluated for heat resistance and solvent resistance according to the methods described As described above, the present invention provides fine polymer particles having excellent solvent resistance and heat resistance and a sharp particle size distribution, as well as a emulsion of such fine polymer particles. Like inorganic fillers, the fine polymer particles or the emulsion according to the invention can be added in the stage of polymerizing or melt processing resins at high temperatures. There is only a small difference in specific gravities between the fine polymer particles of the invention and the resins, which leads to a significant improvement of dispersibility in and affinity for the resins.

The invention also provides an novel epoxy ester used for preparing such fine polymer particles.

What is claimed is:

1. Fine particles of high heat resistant polymer obtained by emulsion polymerization or seeded polymerization of at least one epoxy ester (C) having two or more unsaturated bonds in one molecule and at least one reactive monomer (D) having at least one unsaturated double bond in one molecule, in the absence of a water-insoluble inorganic material as a dispersion stabilizer, said epoxy ester (C) being obtained by adding at least one unsaturated monobasic acid (B) to at least one epoxide (A-1) having at least one glycidyl group and one monocyclic hydrocarbon group in one molecule, and/or at least one epoxide (A-2) having at least one cycloaliphatic epoxy group in one molecule.

2. Fine particles of high heat resistant polymer in accordance with claim 1, wherein said epoxide (A-1) having one monocyclic hydrocarbon group is an epoxide comprising one benzene ring, one cyclohexane ring, one cyclohexene ring, or one cyclohexadiene ring.

3. Fine particles of high heat resistant polymer in accordance with claim 1, which are obtained by emulsion polymerization or seeded-polymerization of 20 through 100% by weight of said epoxy ester (C) and 80% or less by weight of said reactive monomer (D).

4. Fine particles of high heat resistant polymer in accordance with claim 1, wherein said unsaturated monobasic acid (B) is acrylic acid or methacrylic acid.

5. Fine particles of high heat resistant polymer in accordance with claim 1, which are obtained by emulsion polymerization or seeded polymerization of said epoxy ester (C) and said reactive monomer (D) in water or an alcoholic medium, and which have a particle size ranging from 0.01 to 10 μm and a ration Dw/Dn of a weight-average particle size Dw to a number-average particle size Dn being not greater than 5.

6. Fine particles of high heat resistant polymer in accordance with claim 1, which are obtained through emulsion polymerization or seeded polymerization of said epoxy ester (C) and said reactive monomer (D), and which have a particle size ranging from 0.01 to 3 μm and a ratio Dw/Dn of a weight-average particle size Dw to a number-average particle size Dn being not greater than 2.

7. A polymer emulsion prepared by dispersing, in water, fine particles of high heat resistant polymer obtained by emulsion polymerization or seeded polymerization of at least one epoxy ester (C) having two or more unsaturated bonds in one molecule and at least one reactive monomer (D) having at least one unstaturated double bond in one molecule, in the absence of a water-insoluble inorganic material as a dispersion stabilizer, said epoxy ester (C) being obtained by adding at least one unsaturated monobasic acid (B) to at least one epoxide (A-1) having at least one glycidyl group and one monocyclic hydrocarbon group in one molecule, and/or at least one epoxide (A-2) having at least one cycloaliphatic epoxy group in one molecule.

8. A polymer emulsion in accordance with claim 7, wherein said epoxide (A-1) having one monocyclic hydrocarbon group is an epoxide comprising one benzene ring, one cyclohexane ring, one cyclohexene ring, or one cyclohexadiene ring.

9. A polymer emulsion in accordance with claim 7, wherein said fine particles of high heat resistant polymer are obtained by emulsion polymerization or seeded polymerization of 20 through 100 % by weight of said epoxy ester (C) and 80% or less by weight of said reactive monomer (D).

10. A polymer emulsion in accordance with claim 7, wherein said unsaturated monobasic acid (B) is acrylic acid or methacrylic acid.

11. A polymer emulsion in accordance with claim 7, wherein said fine particles of high heat resistant polymer are obtained by emulsion polymerization or seeded polymerization of said epoxy ester (C) and said reactive monomer (D) in water or an alcoholic medium and have a particle size ranging from 0.01 to 10 μm and a ratio Dw/Dn of a weight-average particle size Dw to a number-average particle size Dn being not greater than 5.

12. A polymer emulsion in accordance with claim 7, wherein said fine particles of high heat resistant polymer are obtained through emulsion polymerization or seeded polymerization of said epoxy ester (C) and said reactive monomer (D) and have a particle size ranging from 0.01 to 3 μm and a ratio Dw/Dn of a weight-average particle size Dw to a number-average particle size Dn being not greater than 2.

* * * * *